(No Model.)

B. M. HAIR.
BELT PUNCH.

No. 311,121. Patented Jan. 20, 1885.

Witnesses:
Frank J. Blanchard
J. B. Halpenny

Inventor:
Benjamin M. Hair.
By F. F. Warner
his Attorney

UNITED STATES PATENT OFFICE.

BENJAMIN M. HAIR, OF CHICAGO, ILLINOIS.

BELT-PUNCH.

SPECIFICATION forming part of Letters Patent No. 311,121, dated January 20, 1885.

Application filed June 2, 1884. (No model.)

*To all whom it may concern:*

Be it known that I, BENJAMIN M. HAIR, residing at Chicago, in the county of Cook and State of Illinois, have invented certain new and useful Improvements in Belt Punches or Tools, of which the following, in connection with the accompanying drawings, is a specification.

Figure 1:
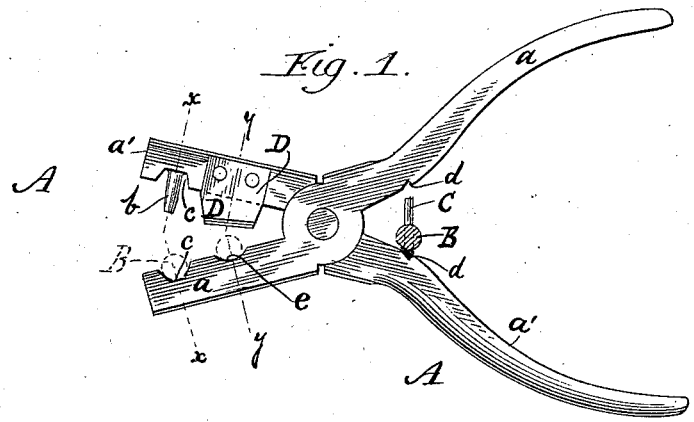
Figure 2:
Figure 3:
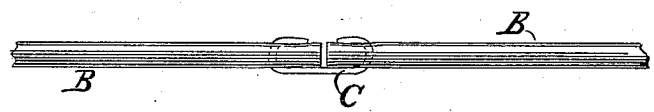
Figure 4:
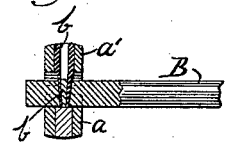
Figure 5:
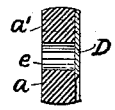

In the drawings, Figure 1 is a side view of a belt punch or tool embodying my improvements. Fig. 2 is a like representation of the belt-link as bent for being inserted into the ends of the belt. Fig. 3 is a like representation showing the ends of the belt joined by means of the said link. Fig. 4 is a sectional detail in the plane of the line $x$ $x$ of Fig. 1, excepting that the jaws of the punch are represented in the position occupied by them as the belt is punched; and Fig. 5 is a sectional detail in the plane of the line $y$ $y$ of Fig. 1, excepting that the jaws are shown closed.

Like letters of reference indicate like parts.

Heretofore small belts—such, for example, as those usually employed for driving the working parts of sewing-machines—have been made of leather and cylindrical in form. In making these belts ready to be applied they are first cut so as to be of the proper length, according to the machine to which they are to be fitted. The belts are then punched near their ends to receive the ends of a link made of flexible wire, and the ends of the links, after being inserted into the holes thus made, are bent down upon the belt. Small tools have heretofore been furnished for the purpose of punching the belt and bending down the ends of the links, and means for doing this work have been embodied in the same tool. A separate knife or tool has, however, been employed for cutting the belts.

The purpose of my invention is to provide a tool embodying in it means for cutting the belts, and also means for performing some or all of the other work above referred to as having to be performed by one and the same tool.

A represents the punch, which consists of two intersecting levers, $a$ and $a'$, jointed or pivoted at their intersection, and one jaw or arm of which carries a hollow punch, $b$, and both of which are cut away, as shown at $c$, to receive the belt B.

C is the link for connecting the ends of the belt. This link, before being applied, has the form shown in Fig. 2, or substantially the same form. The first step in fitting the belt to be applied is to cut it of suitable length, as before stated. The next step is to punch it near its ends to receive the link when in the form shown in Fig. 2. The position the parts occupy when the punch has made a hole is illustrated in Fig. 4. The link is then inserted into the holes so made, and the last step is to bend down the ends of the link upon the belt. To facilitate this work, notches $d$ $d$ have been made in the handles of the punch, and the belt, with the link inserted in it, but not bent down upon it, has been inserted between these notches, as shown in Fig. 1. Then by bringing the handles toward each other the projecting ends of the link would be bent down upon the belt, as shown in Fig. 3.

Both the method or process and the tool as thus far described are old; but in order to adapt the same tool to cut the belt or fit it as to length, I apply a blade or cutter, D, to one of its jaws, and in one or both jaws I make a groove, $e$, arranged to prevent the belt from slipping away from or upon the cutting-edge of the cutter. It will be perceived that by this means the belt may be cut by the same tool which performs some or all of the other work heretofore done in fitting the belt for being applied to use, and that a very convenient tool is thus made, and one which may form a part of the kit which is usually supplied with sewing-machines.

Having thus described my invention, what I claim as new, and desire to secure by Letters Patent, is—

A combined punch and cutter of the class hereinbefore described, having in the lever-handles, back of their joint or pivoted point, the notches $d$ $d$, substantially as and for the purposes specified.

In testimony that I claim the foregoing as my own I have hereunto affixed my signature in presence of two witnesses.

BENJAMIN M. HAIR.

Witnesses:
F. F. WARNER,
J. B. HALPENNY.